(12) United States Patent
Sillard et al.

(10) Patent No.: US 10,324,253 B2
(45) Date of Patent: Jun. 18, 2019

(54) FEW MODE OPTICAL FIBERS FOR MODE DIVISION MULTIPLEXING HAVING INTERMEDIATE TRENCHES

(71) Applicant: Draka Comteq BV, Amsterdam (NL)

(72) Inventors: Pierre Sillard, Paron (FR); Denis Molin, Paron (FR); Marianne Bigot, Paron (FR)

(73) Assignee: Draka Comteq BV, Amsterdam (NL)

( * ) Notice: Subject to any disclaimer, the term of this patent is extended or adjusted under 35 U.S.C. 154(b) by 0 days.

(21) Appl. No.: 16/071,588

(22) PCT Filed: Feb. 8, 2016

(86) PCT No.: PCT/IB2016/001018
§ 371 (c)(1),
(2) Date: Jul. 20, 2018

(87) PCT Pub. No.: WO2017/137793
PCT Pub. Date: Aug. 17, 2017

(65) Prior Publication Data
US 2019/0033515 A1    Jan. 31, 2019

(51) Int. Cl.
*G02B 6/028*     (2006.01)
*G02B 6/036*     (2006.01)
*H04J 14/04*     (2006.01)

(52) U.S. Cl.
CPC ......... *G02B 6/0288* (2013.01); *G02B 6/0365* (2013.01); *G02B 6/03638* (2013.01); *H04J 14/04* (2013.01)

(58) Field of Classification Search
CPC .......................... G02B 6/0288; G02B 6/03638; G02B 6/0365; H04J 14/04
See application file for complete search history.

(56) References Cited

U.S. PATENT DOCUMENTS

| 8,705,922 B2 | 4/2014 | Bickham |
| 8,867,880 B2 * | 10/2014 | Molin ............... G02B 6/03627 385/124 |

(Continued)

FOREIGN PATENT DOCUMENTS

| WO | 2011094400 A2 | 8/2011 |
| WO | 2011094400 A3 | 8/2011 |
| WO | 2013126254 A1 | 8/2013 |
| WO | 2015040446 A1 | 3/2015 |

OTHER PUBLICATIONS

International Search Report for PCT/IB2016/001021, dated Dec. 5, 2016 (3 pgs.).

(Continued)

*Primary Examiner* — Andrew Jordan
(74) *Attorney, Agent, or Firm* — Shumaker, Loop & Kendrick, LLP

(57) ABSTRACT

Few mode optical fibers for mode division multiplexing. The Few Mode Fiber supporting 25 or 30 LP guided modes and includes a graded index core with a α-profile, a radius $R_1$ (at 0 refractive index difference) between 21.5 and 27 µm and a maximum refractive index difference $Dn_1$ between $12.5 \times 10^{-3}$ and $20 \times 10^{-3}$, and an end of the α-profile at a radius $R_{1b}$, with index difference $Dn_{1b}$; a trench surrounding the core with radius $R_3$ between 30 and 42 µm and refractive index difference $Dn_3$ between $-15.10^{-3}$ and $-6.10^{-3}$, an intermediate depressed trench with a radius $R_2$, with $R_{1b} < R_2 < R_3$ and a refractive index difference $Dn_2$, with $Dn_3 < Dn_2 < 0$, wherein: for $|Dn_{1b} - Dn_2| >= 0.5 \times 10^{-3}$, $Min(Dn_{1b}, Dn_2) \le -1.5 \times 10^{-3}$, and for $|Dn_{1b} - Dn_2| < 0.5 \times 10^{-3}$, $Dn_2$ is between $-5 \times 10^{-3}$ and $-3.5 \times 10^{-3}$.

23 Claims, 4 Drawing Sheets

(56) References Cited

U.S. PATENT DOCUMENTS

| | | | |
|---|---|---|---|
| 9,405,062 B2* | 8/2016 | Krabshuis | G02B 6/0281 |
| 2010/0303428 A1 | 12/2010 | Bickham et al. | |
| 2010/0310218 A1* | 12/2010 | Molin | G02B 6/0288 |
| | | | 385/123 |
| 2012/0275751 A1* | 11/2012 | Krabshuis | G02B 6/0281 |
| | | | 385/126 |
| 2012/0294576 A1 | 11/2012 | Li | |
| 2013/0028564 A1 | 1/2013 | Molin et al. | |
| 2013/0216181 A1 | 8/2013 | Bickham et al. | |
| 2013/0230289 A1 | 9/2013 | Hammerle et al. | |
| 2014/0334787 A1 | 11/2014 | Hammerle et al. | |
| 2015/0168643 A1 | 6/2015 | Gruner-Nielsen et al. | |
| 2019/0033515 A1* | 1/2019 | Sillard | G02B 6/0288 |

OTHER PUBLICATIONS

Written Opinion of the International Searching Authority for PCT/IB2016/001021 dated Aug. 17, 2017 (5 pgs.).

P. Sillard et al., "50pm Multimode Fibers for Mode Division Multiplexing", proc. Ecoc 4.21.1—2015.

International Preliminary Report on Patentability issued in International Patent Application No. PCT/IB2016/001021 dated Aug. 14, 2018.

International Search Report for PCT/IB2016/001018 dated Dec. 5, 2016 (3 pgs.).

Written Opinion of the International Searching Authority for PCT/IB2016/001018 dated Aug. 17, 2017 (5 pgs.).

* cited by examiner

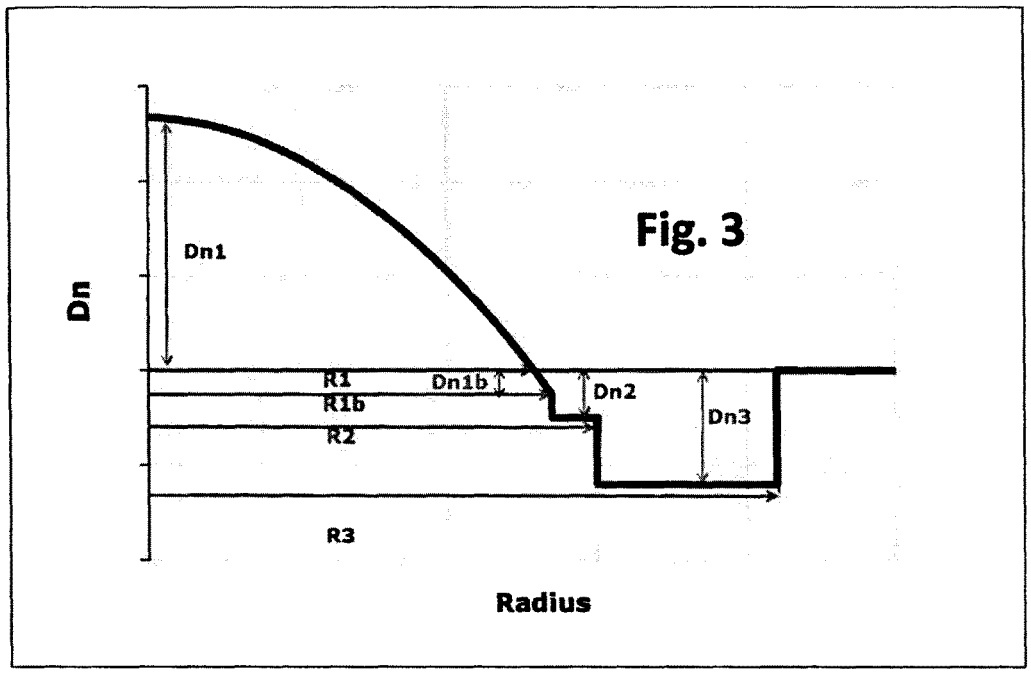
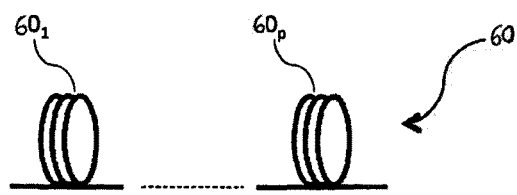
Figure 6

FEW MODE OPTICAL FIBERS FOR MODE DIVISION MULTIPLEXING HAVING INTERMEDIATE TRENCHES

1. FIELD OF THE INVENTION

The present disclosure relates to the field of fiber optic transmission, and, more specifically, to improved few-mode fiber designs for mode division multiplexing.

2. BACKGROUND

An optical fiber is conventionally constituted of an optical core, which transmits an optical signal, and of an optical cladding, which confines the optical signal within the optical core. To that end the refractive index of the core, $n_0$, is greater than the one of the cladding, $n_{Cl}$. An optical fiber is generally characterized by a refractive index profile that associates the refractive index (n) with the radius (r) of the optical fiber: the distance r with respect to the center of the optical fiber is shown on x-axis and the difference Dn between the refractive index at radius r, n(r), and the refractive index of the optical cladding $n_{Cl}$ is shown on y-axis.

Nowadays, two main categories of optical fibers exist: multimode fibers and single-mode fibers. In a multimode fiber, for a given wavelength, several optical modes can propagate simultaneously along the optical fiber, whereas in a single-mode fiber, the higher order modes (hereafter called HOMs) are cut-off or highly attenuated.

Single-mode fibers are commonly used for long-distance applications, such as access networks, metropolitan networks or long-haul networks. To obtain an optical fiber capable to transmit a single-mode optical signal, a core with a relatively small diameter is required (typically between 5 µm and 15 µm). To meet requirements of high speed or bit-rate applications (for example 10 Gbps), standard single-mode fibers require use of a modulated single-mode laser emitter tuned to work typically at a wavelength of 1550 nm. However, single-mode fibers suffer from nonlinearity problems, which are major limitations on fiber transmission capacity.

Multimode fibers are commonly used for short-distance applications requiring a high bandwidth, such as local area networks (LANs), multi-dwelling units (MDUs), and data centers, more generally known as in-building networks. The core of a multimode fiber typically has a diameter of 50 µm, or 62.5 µm. The most prevalent multimode fibers in telecommunications are the refractive graded-index profile optical fibers. By minimizing the intermodal dispersion (i.e. the difference between the propagation delay times or group velocity of the optical modes along the optical fiber, also called DMGD for Differential Mode Group Delay), such a refractive index profile guaranties a high modal bandwidth for a given wavelength.

Since data traffic over fiber optic networks continues to grow exponentially, there is an increasing demand for increasing per-fiber traffic particularly across long distances. To this end, multiplexing techniques have been developed that allow a plurality of separate data streams to share the same optical fiber. Among these techniques, one promising approach is space division multiplexing (SDM), in which a plurality of data channels within a single optical fiber are provided by a respective plurality of optical signal modes guided by the fiber.

Such a technique has required the development of new types of optical fibers, called few-mode optical fibers, which support more than one spatial mode but fewer spatial modes than the multi-mode fibers. Such few-mode fibers, which are notably discussed in the PCT patent document WO2011/094400, support 2 LP modes or more.

Space-division-multiplexed transmissions using Few-Mode Fibers (FMFs) have hence recently received considerable attention because of their potential to multiply the capacity of single-mode transmissions by the number of modes that will be used.

One approach to the design of Few-Mode Fibers consists of minimizing the Differential Mode Group Delays (DMGDs, i.e. the difference in the respective arrival times of the guided modes used for spatial multiplexing), so that all modes can be simultaneously detected using complex 2N×2N (N being the total number of spatial modes, i.e. including LP (Linear Polarization) mode degeneracies) multiple-input-multiple-output (MIMO) techniques, regardless mode-coupling phenomena that is one of the limiting factor to bridge long distances. In this approach, a careful design of the FMF is required in order to reduce the DMGD (preferably below 300 ps/km to preserve MIMO efficiency) while still providing low bend losses for all guided LP modes.

This optimization, however, becomes more and more difficult when the number of LP modes increases. So far, only FMFs supporting up to 20 usable LP modes with low Differential Modes Group Delays (DMGDs) have been reported.

In "50 µm Multimode Fibers for Mode Division Multiplexing" (proc. Ecoc 4.2.1-2015), P. Sillard et al. disclose 50 µm-diameter graded-index core multimode fibers, which can be adapted to mode-division-multiplexed transmissions that use MIMO digital signal processing and selective mode multiplexing. Such fibers were realized and characterized and compared to low-differential-mode-group-delay few-mode fibers.

FIG. 1 illustrates the refractive index difference with respect to the radius of such a FMF with a core diameter of 50 µm that supports 30 LP modes at 1550 nm but in which only 20 LP modes are usable. Actually, a severe degradation of the bend losses prevents the use of the $9^{th}$ and $10^{th}$ mode groups in space-division-multiplexed systems for such fibers.

Patent document US 2015/0168643 discloses a few-mode fiber, having a graded-index core and a surrounding cladding comprising a layer between the core and the trench, a down-doped trench abutting the layer, and an undoped cladding region abutting the trench. The fiber's refractive index profile is configured to support 9 to 20 LP modes for transmission of a spatially-multiplexed optical signal. Undesired modes have respective effective indices that are close to, or less than, the cladding index so as to result in leakage of the undesired modes into the outer cladding. The index spacing between the desired mode having the lowest effective index and the leaky mode with the highest effective index is sufficiently large so as to substantially prevent coupling there between.

Although such designs are promising, they do not allow supporting 25 or 30 usable LP modes while reducing the Differential Mode Group Delays as much as desired. In addition, the profiles disclosed in both documents are not optimized to ensure low bend losses, which, however, are mandatory for FMFs.

Accordingly, a need exists for designs for Few-Mode optical Fibers guiding an increased number of supported modes (25 LP modes or more), with small differential mode group delays between any combination of LP guided modes (preferably below 200 ps/km) and low bend losses (preferably below 100 dB/turn at 10 mm bend radius).

3. SUMMARY OF THE INVENTION

In one particular embodiment of the present disclosure, an optical fiber is proposed comprising a central optical core surrounded by an optical cladding. The optical core has a α graded-index profile n(r) with α between 1 and 3, α being a non-dimensional parameter that defines an index profile shape of said optical core, that is a function of a radial distance r from the center of said optical core. The optical core has a maximum refractive index $n_0$ and an outer radius $R_{1b}$ with a refractive index difference $Dn_{1b}=n(R_{1b})-n_{Cl}$ with respect to said optical cladding having at its outer edge a refractive index $n_{Cl}$. The optical core also has a radius $R_1$, such that $n(R_1)=n_{Cl}$, comprised between 21.5 µm and 27 µm and a maximum refractive index difference $Dn_1=n_0-n_{Cl}$ between $12.5\times10^{-3}$ and $20\times10^{-3}$, said refractive index difference being determined at $\lambda=\lambda_C$, where $\lambda_c$ is a central transmission wavelength of an operating band for which said optical fiber is intended.

Moreover, the optical cladding comprises:
- a region of depressed refractive index $n_{trench}$, called a trench, surrounding the optical core, said trench having an outer radius $R_3$ between 30 µm and 42 µm, and a refractive index difference $Dn_3=n_{trench}-n_{Cl}$ between the trench and the cladding comprised between $-15\times10^{-3}$ and $-6\times10^{-3}$;
- an intermediate region of depressed refractive index, called an intermediate trench, surrounding the optical core, said intermediate trench having an outer radius $R_2$, with $R_{1b}<R_2<R_3$, and a refractive index difference $Dn_2$ between the intermediate trench and the cladding, with $Dn_3<Dn_2<0$.

Said optical fiber is such that:
for $|Dn_{1b}-Dn_2|\geq 0.5\times10^{-3}$, $Min(Dn_{1b}, Dn_2)\leq -1.5\times10^{-3}$, and
for $|Dn_{1b}-Dn_2|<0.5\times10^{-3}$, $Dn_2$ is between $-5\times10^{-3}$ and $-3.5\times10^{-3}$.

As used herein, and unless otherwise specified, the term "α graded-index profile" refers to an optical core having a refractive index profile n(r) defined as follows:

$$n(r) = n_0\sqrt{1-2\Delta\left(\frac{r}{R_{1b}}\right)^\alpha}, r \leq R_{1b}$$

where:
r is a variable representative of the radius of the optical fiber,
$R_{1b}$ is the optical core outer radius,
Δ is the normalized refractive index difference, with $$\Delta = \frac{n_0^2 - n_1^2}{2n_0^2}$$

$n_1$ is the minimal refractive index of the optical core,
$n_0$ is the maximal refractive index of the optical core,
α is a non-dimensional parameter that defines the index profile shape of the optical core.
An alpha parameter α=2 corresponds to an inverted parabola. An alpha parameter α=1 corresponds to a triangular shape, while an alpha parameter α=∞ corresponds to a step function.

Such a FMF optical fiber shows a larger core diameter, as compared to prior art FMF fibers, which allows supporting an increased number of LP modes. Moreover, it comprises a depressed trench, which leads to decrease the macrobending losses by improving the confinement of the optical modes within the core. Such a design thus allows to significantly improve the trade-off between DMGD and bend losses.

Last, such a FMF optical fiber presents a carefully designed interface between the graded-index core and the trench, which allows keeping the DMGDs between any combination of LP guided modes low while keeping the bend loss of any LP guided modes low as well.

According to an embodiment, such an optical fiber has a normalized frequency $$V = \frac{2\pi R_1}{\lambda_c}\sqrt{n_0^2 - n_{Cl}^2}$$

between 18.4 and 23.

According to an embodiment, such an optical fiber guides at least 25 LP modes.

According to another embodiment, such an optical fiber guides at least 30 LP modes.

Such a high number of guided modes allows increasing the capacity of an optical system comprising such a few-mode optical fiber, and answers the demand for higher bandwidth in long-haul optical transmission systems.

A few-mode fiber according to an embodiment of the present disclosure thus guides an increased number of LP modes that can efficiently be used in space-division multiplexed transmissions, as compared to prior art FMFs.

According to a further embodiment, Max|DMGDs|<200 ps/km at $\lambda=\lambda_C$, where $\lambda_c$ is a central transmission wavelength of an operating band for which said optical fiber is intended, where DMGD is the Differential Mode Group Delay between two guided modes in said optical fiber, and where Max|DMGDs| is the absolute maximum value of DMGD between any combination of guided modes. DMGD can be characterized, for instance, by using the standard differential-mode-delay measurement procedure of multi-mode fibers, i.e. measuring pulses responses of the fiber for single-mode launches that radially scan the fiber core (a centered launch excites the lowest-order modes, while large offset launches excite the highest-order modes).

According to yet a further embodiment, Max|DMGDs|<500 ps/km for $\lambda\in[\lambda_C-\delta\lambda; \lambda_C+\delta\lambda]$, where $\lambda_c$ is a central transmission wavelength of an operating band for which said optical fiber is intended and where 2δλ is a width of said operating band.

The Differential Mode Group Delays are hence very low, while the challenge of increasing the number of LP modes up to 25 or 30 is met.

According to an embodiment, the fundamental $LP_{01}$ mode guided by said optical fiber has an effective area $A_{eff}>150$ µm² at $\lambda=\lambda_C$. Such a relatively large effective area limits intra-mode non-linearity.

According to a further embodiment, Max|BL|<100 dB/turn, preferably <50 dB/turn, at 10 mm bend radius at $\lambda=\lambda_C$, where BL are the bend losses of the different guided modes in said optical fiber, and where Max|BL| is the absolute maximum value of BL for all guided modes. BL can be characterized, for instance, by measuring the loss difference of a given mode selected by a mode multiplexer and injected in the few-mode fiber with and without applying a loop of 10 mm radius using a spectral attenuation bench.

Such a few-mode fiber thus shows a very good trade-off between bend losses and Differential Mode Group Delays.

According to an embodiment, $\lambda_c=1550$ nm and $\delta\lambda=20$ nm.

It is noted that the FMFs described herein and throughout the document are suitable for use within, at a minimum, the entire "C-band" (1530 nm–1565 nm), but also in some cases the S- (1460 nm–1530 nm), L- (1565 nm–1625 nm) and U-bands (1625 nm–1675 nm). The Differential Mode Group Delays of such FMFs are hence very low on all the extended C-band.

Another aspect of the disclosure concerns an optical link comprising at least one optical fiber as described here above in any of its embodiments.

Such an optical link may comprise any number of concatenated optical fibers, as long as one of them at least complies with the features set forth in the present disclosure. Such an optical link may also comprise several optical fibers, which would all comply with the features of the present disclosure.

According to an embodiment, an optical link is provided, which comprises N optical fibers, with $N\geq 2$, N being an integer, each optical fiber of index $i\in [1; N]$ comprising a central optical core and an optical cladding surrounding the optical core, the optical core having a $\alpha_i$ graded-index profile $n_i(r)$ with $\alpha_i$ between 1 and 3, $\alpha_i$ being a non-dimensional parameter that defines an index profile shape of the optical core, that is a function of a radial distance r from the center of said optical core, and the optical core having a maximal refractive index $n_{0i}$, and an outer radius $R_{1bi}$ with a refractive index difference $Dn_{1bi}=n_i(R_{1bi})-n_{Cli}$ with respect to said optical cladding having at its outer edge a refractive index $n_{Cli}$, said optical core also having a radius $R_{1i}$, such that $n_i(R_{1i})=n_{Cli}$, and a maximum refractive index difference $Dn_{1i}=n_{0i}-n_{Cli}$, said optical cladding comprising:
- a region of depressed refractive index $n_{trenchi}$, called a trench, surrounding the optical core, said trench having an outer radius $R_{3i}$, and a refractive index difference $Dn_{3i}=n_{trenchi}-n_{Cli}$ between the trench and the cladding;
- an intermediate region of depressed refractive index, called an intermediate trench, surrounding the optical core, said intermediate trench having an outer radius $R_{2i}$, with $R_{1bi}<R_{2i}<R_{3i}$, and a refractive index difference $Dn_{2i}$ between the intermediate trench and the cladding, with $Dn_{3i}<Dn_{2i}<0$.

Such an optical link is such that:
an average optical core radius $R_{1link}$ for said optical link is comprised between 21.5 µm and 27 µm, where $$R_{1link} = \frac{\sum_{i=1}^{N} R_{1i} L_i}{\sum_{i=1}^{N} L_i}$$

with $L_i$ a length of optical fiber i in said link,
an average maximum refractive index difference $Dn_{1link}$ for said optical link is between $12.5\times 10^{-3}$ and $20\times 10^{-3}$, where $$Dn_{1link} = \frac{\sum_{i=1}^{N} Dn_{1i} L_i}{\sum_{i=1}^{N} L_i},$$

at $\lambda=\lambda_C$, where $\lambda_c$ is a central transmission wavelength of an operating band for which said optical fiber is intended,
an average trench outer radius $R_{3link}$ for said optical link is between 30 µm and 42 µm, where $$R_{3link} = \frac{\sum_{i=1}^{N} R_{3i} L_i}{\sum_{i=1}^{N} L_i}$$

with $L_i$ a length of optical fiber i in said link,
an average refractive index difference between the trench and the cladding $Dn_{3link}$ for said optical link is comprised between $-15\times 10^{-3}$ and $-6\times 10^{-3}$, at $\lambda=\lambda_C$, where $$Dn_{3link} = \frac{\sum_{i=1}^{N} Dn_{3i} L_i}{\sum_{i=1}^{N} L_i},$$

and:
for $|Dn_{1link}-Dn_{2link}|\geq 0.5\times 10^{-3}$, $Min(Dn_{1link}, Dn_{2link})\leq -1.5\times 10^{-3}$, and
for $|Dn_{1link}-Dn_{2link}|<0.5\times 10^{-3}$, $Dn_{2link}$ is between $-5\times 10^{-3}$ and $-3.5\times 10^{-3}$ where $$Dn_{2link} = \frac{\sum_{i=1}^{N} Dn_{2i} L_i}{\sum_{i=1}^{N} L_i}$$

is the average refractive index difference between the intermediate trench and the cladding for said optical link and where $$Dn_{1blink} = \frac{\sum_{i=1}^{N} Dn_{1bi} L_i}{\sum_{i=1}^{N} L_i}$$

is the average refractive index difference between the core at its outer radius and the cladding for said optical link, both at $\lambda=\lambda_C$, where $\lambda_c$ is a central transmission wavelength of an operating band for which said optical link is intended.

By properly choosing the respective lengths $L_i$ of all optical fibers constituting the optical link, it is possible to build a few-mode optical fiber link, which allow guiding an increased number of LP modes as compared to prior art FMFs, while reaching the lowest Differential Mode Group Delay. Such an optical link is hence a DMGD-compensated FMF link and may show improved properties over the individual FMFs comprised in said optical link. Such low DMGD allow all modes being simultaneously detected using 2N×2N (N being the total number of spatial modes, i.e. including LP mode degeneracies) MIMO ("Multiple Input Multiple Output") techniques, regardless mode coupling phenomena. The system reach is thus increased over prior art.

Such an optical link shows properties similar to those described previously in relation to the FMF optical fiber, notably in terms of number of LP modes supported, and low values of DMGDs. Optical fibers comprised in this optical link show depressed trenches, which allow decreasing the macrobending losses by improving the confinement of the optical modes within the core.

According to an embodiment, such an optical link has a normalized frequency $$V_{link} = \frac{2\pi R_{1link}}{\lambda_c}\sqrt{n_{0link}^2 - n_{Clink}^2}$$

comprised between 18.4 and 23, where $$n_{0link} = \frac{\sum_{i=1}^{N} n_{0i} L_i}{\sum_{i=1}^{N} L_i}$$

is the average maximum refractive index of the core for said optical link, and where $$n_{Clink} = \frac{\sum_{i=1}^{N} n_{Cli} L_i}{\sum_{i=1}^{N} L_i}$$

is the average refractive index of the cladding for said optical link.

According to an embodiment, such an optical link guides at least 25 LP modes.

According to an embodiment, such an optical link guides at least 30 LP modes.

According to a further embodiment, for all optical fibers $i \in [1; N]$ in said link, said lengths $L_i$ are chosen so as to minimize $Max|DMGD_{link}|$ on said link, where $DMGD_{link}$ is the Differential Mode Group Delay between two guided modes in said optical link, and where $Max|DMGD_{link}|$ is the absolute maximum value of Differential Mode Group Delay between any combination of guided modes in said optical link.

According to yet a further embodiment, at least two optical fibers in said link have $DMGD_i$ showing opposite signs for at least one mode guided by said optical fibers, where $DMGD_i$ is the Differential Mode Group Delay between said one mode and any other guided mode in optical fiber i.

Hence, such an optical link may be formed with optical fibers which meet the criteria set forth above in relation to the optical fiber according to embodiments of the disclosure, but differ from each other within a certain tolerance and show Differential Mode Group Delays with opposite signs, which may compensate each other once assembled in an optical link. A tolerance of $\pm 0.5 \times 10^{-3}$ on the refractive index differences, of $\pm 0.5$ μm on the radii of the fiber, and of $\pm 0.02$ on the α, is acceptable for optical fibers forming such an optical link.

According to an embodiment, $Max|DMGD_{link}| < 200$ ps/km at $\lambda = \lambda_C$, where $\lambda_c$ is a central transmission wavelength of an operating band for which said optical fiber is intended.

According to a further embodiment, $Max|DMGD_{link}| < 500$ ps/km for $\lambda \in [\lambda_C - \delta\lambda; \lambda_C + \delta\lambda]$, where $\lambda_c$ is a central transmission wavelength of an operating band for which said optical fiber is intended and where $2\delta\lambda$ is a width of said operating band.

According to yet another embodiment, $Max|BL_{link}| < 100$ dB/turn, preferably $<50$ dB/turn, at 10 mm bend radius $\lambda = \lambda_C$, where $BL_{link}$ are the bend losses of the different guided modes in said optical link, and where $Max|BL_{link}|$ is the absolute maximum value of $BL_{link}$ for all guided modes in said optical link.

Preferably, $\lambda_c = 1550$ nm and $\delta\lambda = 20$ nm.

The present disclosure also concerns an optical link comprising N optical fibers, with $N \geq 2$, N being an integer. Each optical fiber complies with the requirements set forth above according to embodiments of the present disclosure. Any two optical fibers chosen among the N optical fibers forming the optical link have refractive index differences $Dn_1$ and/or $Dn_2$ and/or $Dn_3$ at $\lambda_c$ with values differing by a maximum of $\pm 0.5 \times 10^{-3}$ and/or radii $R_1$ and/or $R_{1b}$ and/or $R_2$ and/or $R_3$ with values differing by a maximum of $\pm 0.5$ μm. Moreover, at least two of said N optical fibers have DMGD with opposite signs, where DMGD is the Differential Mode Group Delay between two guided modes in said optical fiber.

Hence, such an optical link may be formed with optical fibers, which are not exactly identical and show Differential Mode Group Delays with opposite signs, which may compensate each other once assembled in an optical link. Such an optical link is hence a DMGD compensated link. Moreover, a tolerance of $\pm 0.02$ on the α, between any combination of optical fibers forming the optical link is also acceptable.

Another aspect of the disclosure concerns an optical system comprising at least one optical fiber or at least one optical link as described here above in any of its embodiments.

5. BRIEF DESCRIPTION OF THE DRAWINGS

Other features and advantages of embodiments of the present disclosure shall appear from the following description, given by way of an indicative and non-exhaustive examples and from the appended drawings, of which:

FIG. 1 graphically provides the refractive index profile of a prior art FMF optical fiber supporting 30 LP modes at 1550 nm but in which only 20 LP modes are usable;

FIG. 2 schematically depicts an isometric view of an exemplary FMF optical fiber according to one or more embodiments described herein;

FIG. 3 graphically provides the illustrative refractive index profile of FMF optical fibers according to embodiments of the present disclosure;

FIG. 4 graphically provides the refractive index profile of two exemplary FMF optical fibers according to embodiments of the present disclosure;

FIG. 5 graphically provides the refractive index profile of two other exemplary FMF optical fibers according to embodiments of the present disclosure;

FIG. 6 illustrates an optical link according to an embodiment of the present disclosure;

Figure 1:
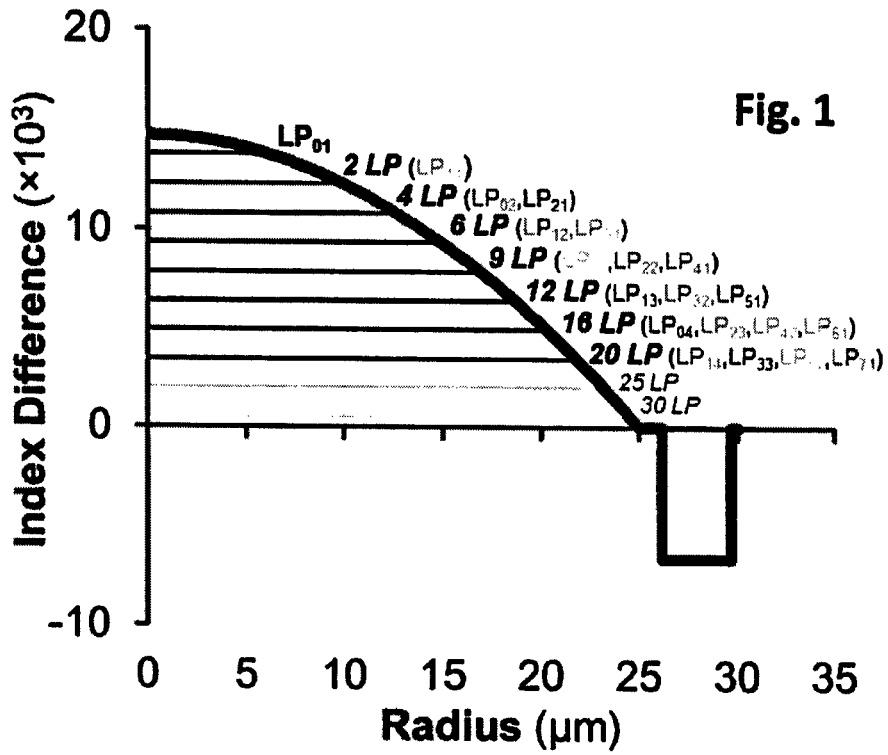

The components in the figures are not necessarily to scale, emphasis instead being placed upon illustrating the principles of the present disclosure.

6. DETAILED DESCRIPTION

The general principle of the present disclosure is to propose a carefully designed trench-assisted graded index few-mode optical fiber, showing reduced Differential Mode Group Delay and supporting more LP modes over prior art FMFs. More precisely, the purpose of such a design is to optimize the interface between the graded-index core and the trench, in order to increase the number of supported LP modes up to 25 or 30, while keeping the Differential Mode Group Delay between any combination of LP guided modes low, preferably below 200 ps/km, and while keeping the bend loss of any LP guided modes low, preferably below 100 dB/turn at 10 mm bend radius.

Light travelling in an optical fiber actually forms hybrid-type modes, which are usually referred to as LP (linear polarization) modes. The $LP_{0p}$ modes have two polarization degrees of freedom and are two-fold degenerate, the $LP_{mp}$ modes with m≥1 are four-fold degenerate. These degeneracies are not counted when designating the number of LP modes propagating in the fiber. Hence, a few-mode optical fiber having two LP modes supports the propagation of all of the $LP_{01}$ and $LP_{11}$ modes, or a few-mode fiber guiding 6 LP modes supports the propagation of all of the $LP_{01}$, $LP_{11}$, $L_{02}$, $LP_{21}$, $LP_{12}$ and $LP_{31}$ modes.

Reference will now be made in detail to embodiments of few-mode optical fibers, examples of which are illustrated in the accompanying drawings. Whenever possible, the same reference numerals will be used throughout the drawings to refer to the same or like parts.

Figure 2:
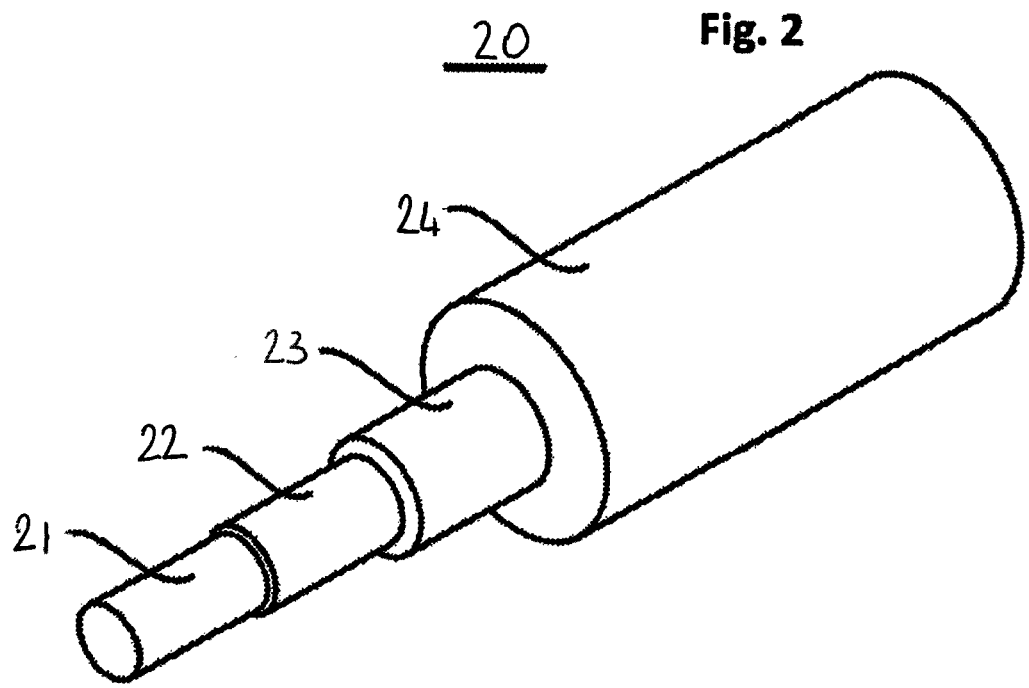

One embodiment of a few-mode optical fiber according to the present disclosure is schematically depicted in isometric view in FIG. 2. The optical fiber 20 generally has a glass core 21 surrounded by a glass cladding. More precisely, the optical fiber 20 comprises four abutting concentric regions, namely:

a graded-index core 21, with an outer radius $R_{1b}$;
an intermediate trench 22, with an inner radius $R_{1b}$ and an outer radius $R_2$;
a trench 23, with an inner radius $R_2$ and an outer radius $R_3$;
an outer cladding 24, with an inner radius $R_3$ and an outer radius $R_4$ and a refractive index $n_{Cl}$.

The radii of the intermediate trench 22 and of the trench 23 are such that $R_{1b}<R_2<R_3$.

In embodiments of the present disclosure, the glass core 21 generally has a radius $R_1$ at zero refractive index difference (i.e. $n(R_1)=n_{Cl}$) from about 21.5 μm to about 27 μm. Moreover, the trench has an outer radius $R_3$ between 30 μm and 42 μm. In the embodiments shown and described herein, the core 21 and the cladding generally comprise silica, specifically silica glass. The cross-section of the optical fiber 20 may be generally circular-symmetric with respect to the center of the core 21. In some embodiments described herein, the radius $R_4$ (i.e. the radius of the glass portion of the optical fiber 10) is about 62.5 μm. However, it should be understood that the dimensions of the cladding may be adjusted such that the radius $R_4$ may be greater than or less than 62.5 μm. The optical fiber 20 also comprises a coating surrounding the cladding. Such a coating may comprise several layers, and it may notably be a dual-layer coating, although these different layers are not shown on FIG. 2.

The different portions in the cladding may comprise pure silica glass ($SiO_2$), silica glass with one or more dopants, which increase the index of refraction (e.g. $GeO_2$ or any other known dopant), such as when the portion of the cladding is "up-doped", or silica glass with a dopant, which decreases the index of refraction, such as fluorine, such as when the portion of the cladding is "down-doped" (e.g. for the intermediate trench 22 or for the trench 23).

Although not illustrated on FIG. 2, the outer cladding 24 may also comprise other portions or layers of lower or higher refractive indexes, for $r>R_3$.

It must also be noted that, in some embodiments, it is possible that $R_1=R_{1b}$.

FIG. 3 depicts the refractive index profile n(r) of optical fiber 20 according to an embodiment of the present disclosure. It describes the relationship between the refractive index value n and the distance r from the center of the optical fiber. The x-axis represents radial position with x=0 representing the center of the core region, and the y-axis represents refractive index, expressed as an index difference Dn unless otherwise stated. Throughout this document, refractive index differences are determined at $\lambda=\lambda_C$, where $\lambda_c$ is a central transmission wavelength of an operating band for which said optical fiber is intended. For example, $\lambda_C$=1550 nm.

In this embodiment, the optical fiber 20 has an optical core 21 having a refractive index profile n(r) defined as follows:

$$n(r) = n_0\sqrt{1 - 2\Delta\left(\frac{r}{R_{1b}}\right)^\alpha}, r \leq R_{1b}$$

where:
r is a variable representative of the radius of the optical fiber,
$R_{1b}$ is the optical core outer radius,
$\Delta$ is the normalized refractive index difference, with $$\Delta = \frac{n_0^2 - n_1^2}{2n_0^2}$$

$n_1$ is the minimal refractive index of the optical core,
$n_0$ is the maximal refractive index of the optical core,
$\alpha$ is a non-dimensional parameter that defines the index profile shape of the optical core.

The alpha refractive index profile of the optical core 21 allows reducing intermodal dispersion of the optical fiber 20. The optical core 21 has a radius $R_1$, at which the refractive index difference of the core with respect to the cladding is equal to zero, as $n(R_1)=n_{Cl}$, with $n_{Cl}$ the refractive index of the outer cladding. The optical core 21 also has a maximum refractive index difference with the outer cladding 24 $Dn_1=n_0-n_{Cl}$ between $12.5\times10^{-3}$ and $20\times10^{-3}$.

At its outer radius $R_{1b}$, the optical central core 21 shows a refractive index difference $Dn_{1b}=n(R_{1b})-n_{Cl}$ with the outer cladding 24. Hence, in embodiments where $R_{1b}>R_1$, the minimal refractive index of the core 21 is not equal to the refractive index of the outer cladding $n_{Cl}$ but shows a negative refractive index difference $Dn_{1b}$ with respect to the optical fiber outer cladding.

In some other embodiments, $R_1=R_{1b}$, and the minimal refractive index of the core 21 is equal to the refractive index of the outer cladding $n_{Cl}$.

The optical core 21 is directly surrounded by an optical cladding, which comprises an intermediate depressed-index region 22, also called an intermediate trench, with inner radius $R_{1b}$ and outer radius $R_2$, a depressed-index ring 23, also called a trench, with inner radius $R_2$ and outer radius $R_3$, and an outer cladding layer 24 with inner radius $R_3$. In some embodiments such an outer cladding layer 24 comprises pure silica glass ($SiO_2$) and its refractive index $n_{Cl}$ is hence that of silica glass.

The intermediate trench 22 has a negative refractive index difference $Dn_2$ with respect to the refractive index of the outer cladding, and the trench 23 has a negative refractive index difference $Dn_3=n_{trench}-n_{Cl}$ comprised between $-15\times10^{-3}$ and $-6\times10^{-3}$, such that $Dn_3<Dn_2<0$. Their position and size are designed so as to improve bend-loss resistance of the fiber. Notably, their design is such that:

for $|Dn_{1b}-Dn_2| \geq 0.5 \times 10^{-3}$, $\text{Min}(Dn_{1b}, Dn_2) \leq -1.5 \times 10^{-3}$, and for $|Dn_{1b}-Dn_2| < 0.5 \times 10^{-3}$, $Dn_2$ is between $-5 \times 10^{-3}$ and $3.5 \times 10^{-3}$.

The careful design of such an intermediate trench 22, associated with the trench 23, allows forming an optimized specific interface between the central optical core and the cladding, and thus allows achieving Few-Mode Fibers, which support 25 or 30 LP guided modes.

Their normalized frequency $$V = \frac{2\pi R_1}{\lambda_c} \sqrt{n_0^2 - n_{Cl}^2}$$

(where $\lambda_C$ is the operating wavelength of the fiber) is between 18.4 and 23.

Max|DMGD| (i.e. the absolute maximum value of the Differential Mode Group Delay between two guided modes in said optical fiber) between any combination of LP guided modes is below 200 ps/km, at λ, here 1550 nm (and more generally at $\lambda=\lambda_C$, where $\lambda_C$ is the central wavelength of any operating band for which the optical fiber is intended). Max|DMGD| is also preferably <500 ps/km from 1530 to 1570 nm (and more generally for any operating wavelength band $[\lambda_C-\delta\lambda; \lambda_C+\delta\lambda]$ where 2δλ is a width of said operating band, preferably δλ=20 nm, such as the C-band, or the L-, S-, or U-band for example).

All LP guided modes of FMFs according to an embodiment of the present disclosure have bend losses <100 dB/turn, preferably <50 dB/turn, at 10 mm bend radius at 1550 nm (and more generally at $\lambda=\lambda_C$, where $\lambda_C$ is the central wavelength of any operating band for which the optical fiber is intended). Moreover, the effective area $A_{eff}$ of the fundamental $LP_{01}$ mode, which is the smallest effective area of all LP guided modes, is >150 μm² at 1550 nm (and more generally at $\lambda=\lambda_C$, where $\lambda_C$ is the central wavelength of any operating band for which the optical fiber is intended). As used herein, the effective area of an optical fiber is the area of the optical fiber in which light is propagated and is determined at the specified mode (e.g. $LP_{01}$), at a wavelength of 1550 nm, unless otherwise specified.

Table 1 gives the parameters of the index profiles of twelve examples of FMFs according to the embodiment of FIGS. 2 and 3 (Ex. 1 to Ex. 12), and results on the normalized frequency V, Max|DMGD|, Max|BL|, and effective area $A_{eff}$.

As may be observed, twelve examples of FMFs according to embodiments of the present disclosure are given, and compared, in the first column of Table 1, with a comparative example Comp. Ex., corresponding to a multimode fiber, which would have been adapted to be used at λ=1550 nm, rather than λ=850 nm as is usually the case for standard multimode fibers. Such an adaptation is performed by modifying the value of α for the graded-index profile of the core, which is around 1.94, rather than α=2.0 as is usually the case for standard MMFs.

For such a comparative example, the core radius is classically $R_1$=25 μm, and the graded-index profile of the core is such that the minimal refractive index of the core is equal to the refractive index of the outer cladding. In other words, $R_1=R_{1b}$. Moreover, there is no intermediate trench 22, and $Dn_2$=0. In other words, there is no specific design of the interface between the optical core and the cladding, which results in very high values of both the maximum Differential Mode Group delays and the maximum bend losses, as Max|DMGD|>500 ps/km and Max|BL|>1000 dB/turn.

Such a fiber (Comp. Ex) may hence not be used as a Few Mode Fiber for Mode Division Multiplexing.

Examples Ex. 1 to Ex. 4, Ex. 7 and Ex. 10 correspond to FMFs supporting 25 LP guided modes, while examples Ex. 5, Ex. 6, Ex. 8, Ex. 9, Ex. 11 and Ex. 12 correspond to FMFs supporting 30 LP guided modes.

Examples Ex. 10 to Ex. 12 correspond to a peculiar embodiment where $R_1=R_{1b}$, and the minimal refractive index of the optical core 21 is equal to the refractive index $n_{Cl}$ of the outer cladding 24.

Examples Ex. 7 to Ex. 9 correspond to another peculiar embodiment, where $Dn_2=Dn_{1b}$, i.e. the refractive index of the intermediate trench 22 is equal to the minimal refractive index of the core 21.

Moreover, examples Ex. 1 to Ex. 6 and Ex. 10 to Ex. 12 correspond to a specific design of the interface between the core and the cladding, which is such that $|Dn_{1b}-Dn_2| \geq 0.5 \times 10^{-3}$, and $\text{Min}(Dn_{1b}, Dn_2) \geq -1.5 \times 10^{-3}$.

Examples Ex. 7 to Ex. 9 correspond to another specific design of the interface between the core and the cladding, which is such that $|Dn_{1b}-Dn_2| < 0.5 \times 10^{-3}$ and $Dn_2$ is between $-5 \times 10^{-3}$ and $-3.5 \times 10^{-3}$.

TABLE 1

|  | Comp. Ex. | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|---|
| Number of guided LP modes | 30 | 25 | 25 | 25 | 25 | 30 | 30 | 25 | 30 | 30 | 25 | 30 | 30 |
| Alpha | 1.940 | 1.94 | 1.94 | 1.94 | 1.94 | 1.93 | 1.93 | 1.94 | 1.93 | 1.94 | 1.91 | 1.92 | 1.92 |
| R1 (μm) | 25.00 | 23.1 | 22.9 | 22.5 | 25.0 | 21.6 | 21.6 | 22.2 | 22.5 | 22.5 | 22.8 | 25.0 | 25.0 |
| Dn1 (×10³ at 1550 nm) | 15.8 | 15.8 | 15.8 | 15.8 | 12.8 | 18.7 | 19.8 | 14.5 | 17.1 | 17.1 | 13.6 | 16.0 | 15.8 |
| R1b (μm) | =R1 | 25.0 | 25.0 | 25.0 | 26.9 | 22.2 | 22.7 | 25.0 | 25.0 | 25.0 | =R1 | =R1 | =R1 |
| Dn1b (×10³ at 1550 nm) | / | −2.6 | −3.0 | −3.6 | −1.9 | −1.0 | −1.9 | −3.9 | −3.9 | −3.9 | 0.0 | 0.0 | 0.0 |
| R2 (μm) | 26.16 | 25.8 | 26.1 | 26.1 | 29.5 | 25.7 | 25.7 | 25.8 | 25.7 | 26.0 | 28.8 | 31.0 | 31.0 |
| Dn2 (×10³ at 1550 nm) | 0.00 | −1.2 | −1.0 | −1.9 | −2.9 | −2.9 | −3.9 | =Dn1b | =Dn1b | =Dn1b | −1.9 | −1.9 | −1.9 |
| R3 (μm) | 30.56 | 32.5 | 32.9 | 33.1 | 38.3 | 33.4 | 33.4 | 33.6 | 33.4 | 33.7 | 37.4 | 40.3 | 40.3 |
| Dn3 (×10³ at 1550 nm) | −6.60 | −6.6 | −9.6 | −9.6 | −6.7 | −6.7 | −6.7 | −6.7 | −6.7 | −7.7 | −6.7 | −6.7 | −8.7 |
| V | 21.7 | 20.1 | 19.9 | 19.5 | 19.6 | 20.4 | 21.0 | 18.4 | 20.4 | 20.4 | 18.4 | 21.8 | 21.7 |
| Max|DMGD| (ps/km) | >500 | 53 | 52 | 55 | 61 | 133 | 142 | 60 | 89 | 87 | 195 | 190 | 195 |
| Max|BL| (dB/turn) | >1000 | 72 | 6 | 4 | 9 | 14 | 7 | 10 | 20 | 9 | 1 | 30 | 29 |
| Aeff LP₀₁ (μm²) | 175 | 162 | 161 | 158 | 196 | 139 | 135 | 163 | 152 | 152 | 171 | 172 | 172 |

Figure 4:
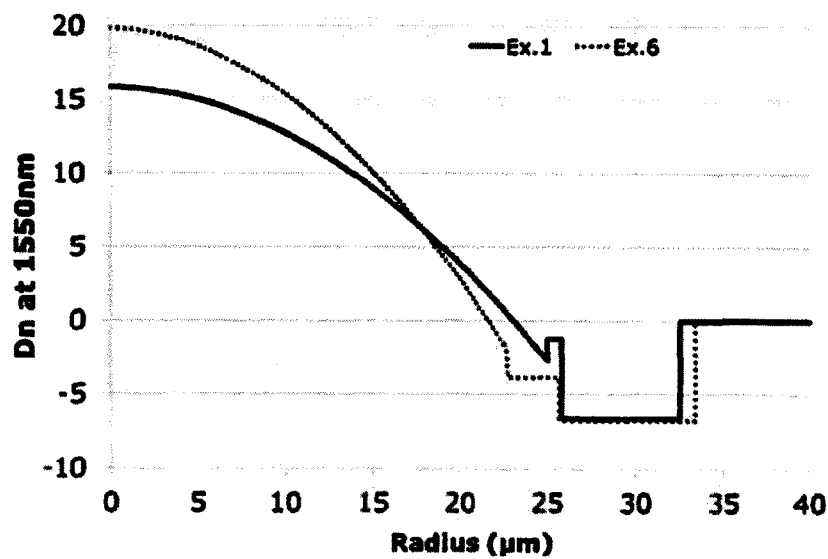

FIG. 4 graphically provides the refractive index profile of two exemplary FMF optical fibers, corresponding to examples Ex. 1 and Ex. 6 in Table 1. The refractive index difference Dn shown on the y-axis is measured at 1550 nm, and the radius of the FMF fiber shown on the x-axis is expressed in µm.

The refractive index difference of the FMF of example Ex. 6 is shown in dashed lines. The graded-index core 21 shows a α-profile with α=1.93, a radius $R_1$=21.6 µm at 0 refractive index difference and a maximum refractive index difference $Dn_1$=19.8×10$^{-3}$ at 1550 nm. The α-profile ends at $R_{1b}$=22.7 µm, with index difference $Dn_{1b}$=−1.9×10$^{-3}$.

An intermediate trench 22 is down-doped as compared to the optical core 21 and shows a refractive index difference with the outer cladding 24 $Dn_2$=−3.9×10$^{-3}$. It ends at radius $R_2$=25.7 µm. It is surrounded by a trench 23, which is down-doped as compared to the intermediate trench 22, and shows a refractive index difference with the outer cladding 24 $Dn_3$=−6.7×10$^{-3}$ at 1550 nm. It ends at radius $R_3$=33.4 µm.

For this example, as indicated in table 1, we have V=21.0, Max|DMGD|=142 ps/km, Max|BL|=7 dB/turn and $A_{eff}$=135 µm$^2$ for the $LP_{01}$ guided mode.

The refractive index difference of the FMF of example Ex. 1 is shown in solid lines. The graded-index core 21 shows a α-profile with α=1.94, a radius $R_1$=23.1 µm at 0 refractive index difference and a maximum refractive index difference $Dn_1$=15.8×10$^{-3}$ at 1550 nm. The α-profile ends at $R_{1b}$=25.0 µm, with index difference $Dn_{1b}$=−2.6×10$^{-3}$.

An intermediate trench 22 is up-doped as compared to minimal refractive index of the optical core 21 and shows a refractive index difference with the outer cladding 24 $Dn_2$=−1.2×10$^{-3}$. It ends at radius $R_2$=25.8 µm. It is surrounded by a trench 23, which is down-doped as compared to the intermediate trench 22, and shows a refractive index difference with the outer cladding 24 $Dn_3$=−6.6×10$^{-3}$ at 1550 nm. It ends at radius $R_3$=32.5 µm.

For this example, as indicated in table 1, we have V=20.1, Max|DMGD|=53 ps/km, Max|BL|=72 dB/turn and $A_{eff}$=162 µm$^2$ for the $LP_{01}$ guided mode.

Figure 5:
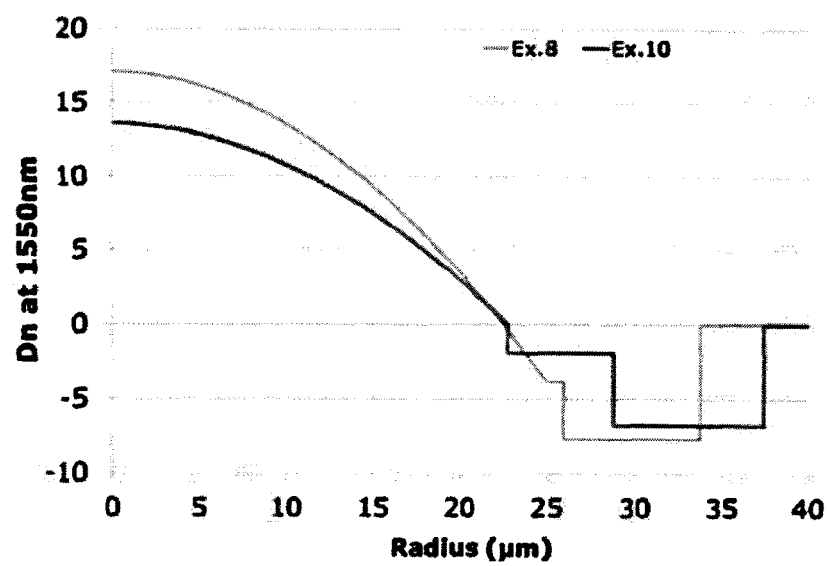

FIG. 5 graphically provides the refractive index profile of two other exemplary FMF optical fibers, corresponding to examples Ex. 8 and Ex. 10 in Table 1. The refractive index difference Dn shown on the y-axis is measured at 1550 nm, and the radius of the FMF fiber shown on the x-axis is expressed in µm.

The refractive index difference of the FMF of example Ex. 8 is shown in grey lines. The graded-index core 21 shows a α-profile with α=1.93, a radius $R_1$=22.5 µm at 0 refractive index difference and a maximum refractive index difference $Dn_1$=17.1×10$^{-3}$ at 1550 nm. The α-profile ends at $R_{1b}$=25.0 µm, with index difference $Dn_{1b}$=−3.9×10$^{-3}$.

An intermediate trench 22 has a refractive index, which is equal to the minimal refractive index of the optical core 21, and hence shows a refractive index difference with the outer cladding 24 $Dn_2$=$Dn_{1b}$=−3.9×10$^{-3}$. It ends at radius $R_2$=25.7 µm. It is surrounded by a trench 23, which is down-doped as compared to the intermediate trench 22, and shows a refractive index difference with the outer cladding 24 $Dn_3$=−6.7×10$^{-3}$ at 1550 nm. It ends at radius $R_3$=33.4 µm.

For this example, as indicated in table 1, we have V=20.4, Max|DMGD|=89 ps/km, Max|BL|=20 dB/turn and $A_{eff}$=152 µm$^2$ for the $LP_{01}$ guided mode.

The refractive index difference of the FMF of example Ex. 10 is shown in black solid lines. The graded-index core 21 shows a α-profile with α=1.91, a radius $R_1$=22.8 µm at 0 refractive index difference and a maximum refractive index difference $Dn_1$=13.6×10$^{-3}$ at 1550 nm. The α-profile ends at $R_1$=$R_{1b}$, with a zero refractive index difference with respect to the outer cladding.

An intermediate trench 22 is down-doped as compared to the outer cladding 24 and shows a refractive index difference with the outer cladding 24 $Dn_2$=−1.9×10$^{-3}$. It ends at radius $R_2$=28.8 µm. It is surrounded by a trench 23, which is down-doped as compared to the intermediate trench 22, and shows a refractive index difference with the outer cladding 24 $Dn_3$=−6.7×10$^{-3}$ at 1550 nm. It ends at radius $R_3$=37.4 µm.

For this example, as indicated in table 1, we have V=18.4, Max|DMGD|=195 ps/km, Max|BL|=1 dB/turn and $A_{eff}$=171 µm$^2$ for the $LP_{01}$ guided mode.

FIG. 6 illustrates an optical link 60 according to an embodiment of the present disclosure. Such an optical link comprises p spans of optical fibers, with p≥2, which are spliced together. FIG. 6 only shows optical fiber $60_1$ and optical fiber $60_p$, all the other potential optical fibers in the optical link being symbolized by dashed lines. At least one of the optical fibers in optical link 60 is such that it comprises the features of one embodiment described above. In other words, at least one of the optical fibers supports 25 or 30 LP guided modes and shows the specific design of the interface between the core and the cladding described above in relation to FIGS. 2 to 5, and notably:

A graded index core with a α-profile with α between 1 and 3, a radius $R_1$ (at 0 refractive index difference) between 21.5 and 27 µm and a maximum refractive index difference $Dn_1$ between 12.5×10$^{-3}$ and 20×10$^{-3}$, and an end of the α-profile at a radius $R_{1b}$, with index difference $Dn_{1b}$;

A trench surrounding the core with radius $R_3$ between 30 and 42 µm and refractive index difference $Dn_3$ between −15.10$^{-3}$ and −6.10$^{-3}$, An intermediate depressed trench with a radius $R_2$, with $R_{1b}$<$R_2$<$R_3$ and a refractive index difference $Dn_2$, with $Dn_3$<$Dn_2$<0, and a specific design of the refractive index differences of these different parts of the FMF such that:

For |$Dn_{1b}$−$Dn_2$|≥0.5×10−3, Min($Dn_{1b}$, $Dn_2$)≤−1.5× 10−3, and for:

|$Dn_{1b}$−$Dn_2$|<0.5×10−3, $Dn_2$ is between −5×10−3 and −3.5×10−3.

However, optical link 60 may also be such that several or all the optical fibers it comprises comply with an embodiment of the present disclosure.

In a specific embodiment, optical link 60 is made up of several spans of FMFs, which show DMGD with opposite signs, and which are combined in a same optical link. For example, the spans of FMFs used correspond to FMFs which all meet the criteria and performance described above for FMFs according to embodiments of the present disclosure, but which actual criteria diverge from each other, either on purpose, or because of process variations during manufacturing. For example, considering any pair of fibers forming the optical link, the refractive index differences at 1550 nm achieved for $Dn_1$, $Dn_2$ and $Dn_3$ may differ by no more than ±0.5×10$^{-3}$, the radii $R_1$, $R_{1b}$, $R_2$ and $R_3$ may differ by no more than ±0.5 µm, and the α-value may differ by no more than ±0.02 between any combination of fibers forming the optical link. In other words, the purpose of such an optical link is, among others, to compensate for small profile variations that can occur during the manufacturing process of a few-mode fiber by concatenating several FMFs showing different features.

Actually, there are optimum values for α, for which Max|DMGD| have minimum values, and α lower and higher than these "optimum α" generally exhibit DMGDs with opposite signs.

As a consequence, the inventors have reached the conclusion that, if a FMF is off-target in term of α (i.e. if the α-value of the FMF is either slightly higher or lower than the "optimum α", for example in the order of ±0.02), it is possible to associate it with another FMF showing an appropriate α (i.e. either higher than the "optimum α" if the off-target α is smaller, or smaller than the "optimum α" if the off-target α is higher), by choosing the appropriate lengths for both FMFs, in order to realize a "DMGD-compensated" link.

This association can, for instance, compensate for process variability that may result in FMFs with slightly off-optimum Alphas.

Optical fiber link 60 has a length of L km, which can be of several tens or several hundreds of kilometers. In an example there are at least two spans of fiber $60_1$ and $60_2$. In another example, there are at least five spans of fibers $60_1$ to $60_5$. In yet another example, there are at least ten spans of fiber $60_1$ to $60_{10}$.

In other words, few-mode fibers 1 to p are spliced together to form an optical link 60 of length $L=L_1+\ldots+L_i+\ldots+L_p$, which can be of several tens or several hundreds of kilometers.

The lengths $L_i$ of the different spans of fibers are chosen so as to minimize the maximum DMGD on the optical link, and so that the optical link shows link parameters which fulfill the requirements set forth above for FMF fibers in relation to embodiments of the present disclosure, namely:

an average optical core radius $R_{1link}$ comprised between 21.5 μm and 27 μm, where $$R_{1link} = \frac{\sum_{i=1}^{N} R_{1i} L_i}{\sum_{i=1}^{N} L_i}$$

with $L_i$ the length of optical fiber i in the link, an average maximum refractive index difference $Dn_{1link}$ between $12.5 \times 10^{-3}$ and $20 \times 10^{-3}$, where $$Dn_{1link} = \frac{\sum_{i=1}^{N} Dn_{1i} L_i}{\sum_{i=1}^{N} L_i},$$

at λ=1550 nm, an average trench outer radius $R_{3link}$ between 30 μm and 42 μm, where $$R_{3link} = \frac{\sum_{i=1}^{N} R_{3i} L_i}{\sum_{i=1}^{N} L_i},$$

an average refractive index difference between the trench and the cladding $Dn_{3link}$ comprised between $-15 \times 10^{-3}$ and $-6 \times 10^{-3}$, at λ=1550 nm, where $$Dn_{3link} = \frac{\sum_{i=1}^{N} Dn_{3i} L_i}{\sum_{i=1}^{N} L_i},$$

for $|Dn_{1blink} - Dn_{2link}| \geq 0.5 \times 10^{-3}$, $Min(Dn_{1blink}, Dn_{2link}) \leq 1.5 \times 10^{-3}$, and for $|Dn_{1blink} - Dn_{2link}| < 0.5 \times 10^{-3}$, $Dn_{2link}$ is between $-5 \times 10^{-3}$ and $3.5 \times 10^{-3}$ where $$Dn_{2link} = \frac{\sum_{i=1}^{N} Dn_{2i} L_i}{\sum_{i=1}^{N} L_i}$$

is the average refractive index difference between the intermediate trench and the cladding for the optical link and where $$Dn_{1blink} = \frac{\sum_{i=1}^{N} Dn_{1bi} L_i}{\sum_{i=1}^{N} L_i}$$

is the average refractive index difference between the core at its outer radius and the cladding for the optical link, both at λ=1550 nm.

These DMGD-compensated links, supporting 25 or 30 LP guided modes, have Max|DMGD|<100 ps/km at λ=1550 nm (and more generally at λ=$\lambda_C$, where $\lambda_C$ is the central wavelength of any operating band for which the optical fiber is intended) and <300 ps/km from 1530 to 1570 nm (and more generally for any operating wavelength band [$\lambda_C$−δλ; $\lambda_C$+δλ] where 2δλ is a width of said operating band, preferably δλ=20 nm, such as the C-band, or the L-, S-, or U-band for example).

Figure 7A:
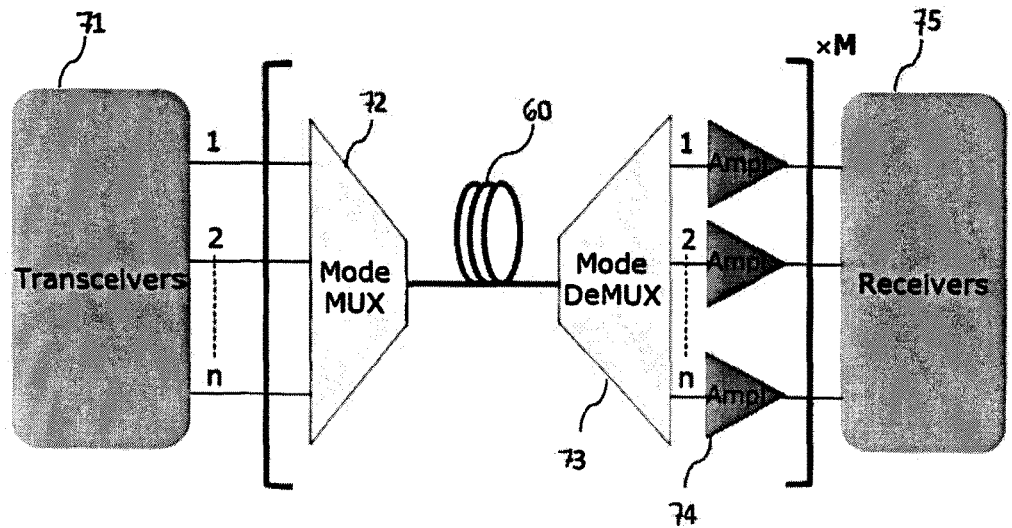
FIGS. 7A and 7B illustrate embodiments of an optical system according to the present disclosure.
Figure 7B:
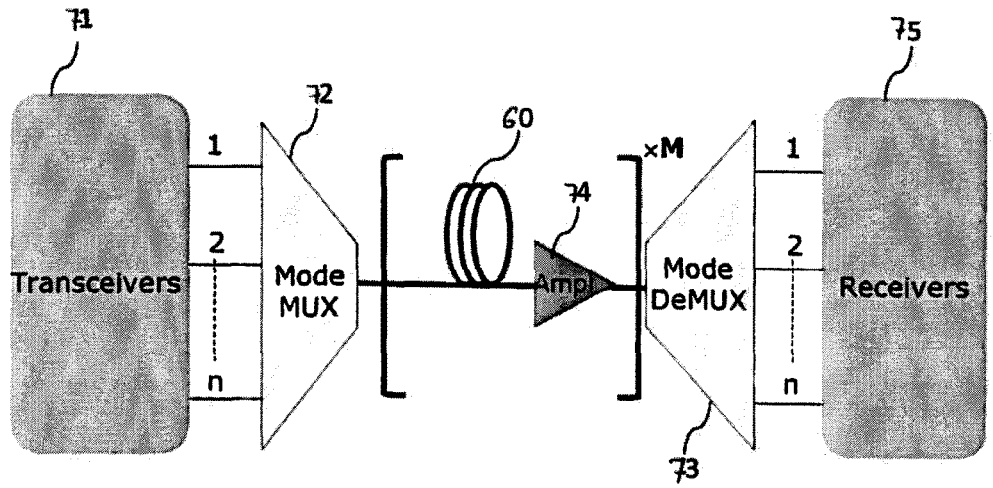

FIGS. 7A and 7B illustrate embodiments of an optical system according to the present disclosure.

According to the first embodiment in FIG. 7A, such an optical system comprises transceivers 71 and receivers 75 optically connected by an optical fiber link 60 that includes at least one span of fiber. Transceivers 71 comprise light sources (such as lasers) and generate n LP modes, referenced 1, 2, . . . , n used in the optical system of FIG. 7A. A mode multiplexer 72 multiplexes the n LP modes and is optically connected to optical link 60, which guides the n multiplexed LP modes, towards a mode demultiplexer 73, which is optically connected to the end of optical link 60.

Mode demultiplexer 73 demultiplexes the n multiplexed LP modes, and feeds each LP mode into an amplifier 74. At the output of amplifiers 74, LP modes enter receivers 75.

Such an optical system may comprise M optical links (or M spans of optical fibers). In an example, M=1; in another example, M=2; in another example M=5; in yet another example, M=10. In case the optical system comprises M optical links or spans, it also comprises M mode multiplexers 72, M mode demultiplexers 73, and M amplifiers 74 for each LP mode guided by the optical system.

The embodiment in FIG. 7B differs from the first embodiment in FIG. 7A in that amplifier 74 amplifies all LP modes guided by the optical fiber 60; as such, amplifier 74 is optically connected between the output of optical link 60 and the input of mode demultiplexer 73. In this second embodiment, when the optical system comprises M optical links or spans, it also comprises M amplifiers 74; however, there is only one mode multiplexer 72, optically connected between transceivers 71 an optical link 60, and only one mode demultiplexer 73, optically connected between amplifier 74 and receivers 75.

The embodiments of FIGS. 7A and 7B are given as mere examples, and an optical fiber according to the present disclosure may of course be used in any other kind of optical system.

The invention claimed is:

1. An optical fiber comprising a central optical core surrounded by an optical cladding, said optical core having a α graded-index profile n(r) with α between 1 and 3, α being a non-dimensional parameter that defines an index profile shape of said optical core, that is a function of a radial distance r from the center of said optical core, said optical core having a maximum refractive index $n_0$ and an outer radius $R_{1b}$ with a refractive index difference $Dn_{1b}=n(R_{1b})-n_{Cl}$ with respect to said optical cladding having at its outer edge a refractive index $n_{Cl}$, said optical core having a radius $R_1$, such that $n(R_1)=n_{Cl}$, comprised between 21.5 μm and 27 μm and a maximum refractive index difference $Dn_1=n_3-n_{Cl}$ between $12.5 \times 10^{-3}$ and $20 \times 10^{-3}$, said refractive index difference being determined at $\lambda=\lambda_C$, where $\lambda_c$ is a central transmission wavelength of an operating band for which said optical fiber is intended, said optical cladding comprising:

a region of depressed refractive index $n_{trench}$, called a trench, surrounding the optical core, said trench having an outer radius $R_3$ between 30 μm and 42 μm, and a refractive index difference $Dn_3=n_{trench}-n_{Cl}$ between the trench and the cladding comprised between $-15 \times 10^{-3}$ and $-6 \times 10^{-3}$;

an intermediate region of depressed refractive index, called an intermediate trench, surrounding the optical core, said intermediate trench having an outer radius $R_2$, with $R_{1b}<R_2<R_3$, and a refractive index difference $Dn_2$ between the intermediate trench and the cladding, with $Dn_3<Dn_2<0$, wherein:

for $|Dn_{1b}-Dn_2| \geq 0.5 \times 10^{-3}$, $\text{Min}(Dn_{1b},Dn_2) \leq -1.5 \times 10^{-3}$, and for $|Dn_{1b}-Dn_2|<0.5 \times 10^{-3}$, $Dn_2$ is between $-5 \times 10^{-3}$ and $-3.5 \times 10^{-3}$.

2. The optical fiber according to claim 1, the optical fiber having a normalized frequency $$V = \frac{2\pi R_1}{\lambda_c}\sqrt{n_0^2 - n_{Cl}^2}$$

that is between 18.4 and 23.

3. The optical fiber according to claim 1, wherein the optical fiber guides at least 25 LP modes.

4. The optical fiber according to claim 1, wherein the optical fiber guides at least 30 LP modes.

5. The optical fiber according to claim 1, wherein Max|DMGDs|<200 ps/km at $\lambda=\lambda_C$, where $\lambda_c$ is a central transmission wavelength of an operating band for which said optical fiber is intended, where DMGD is the Differential Mode Group Delay between two guided modes in said optical fiber, and where Max|DMGDs| is the absolute maximum value of DMGD between any combination of guided modes.

6. The optical fiber according to claim 5, wherein Max|DMGDs|<500 ps/km for $\lambda \in [\lambda_C-\delta\lambda; \lambda_C+\delta\lambda]$, where $\lambda_c$ is a central transmission wavelength of an operating band for which said optical fiber is intended and where $2\delta\lambda$ is a width of said operating band.

7. The optical fiber according to claim 1, wherein the fundamental $LP_{01}$ mode guided by said optical fiber has an effective area $A_{eff}>150$ μm² at $\lambda=\lambda_C$.

8. The optical fiber according to claim 1, wherein Max|BL|<100 dB/turn at 10 mm bend radius at $\lambda=\lambda_C$, where BL are the bend losses of the different guided modes in said optical fiber, and where Max|BL| is the absolute maximum value of BL for all guided modes.

9. The optical fiber according to claim 1, wherein $\lambda_c=1550$ nm and $\delta\lambda=20$ nm.

10. An optical link comprising at least one optical fiber according to claim 1.

11. An optical system comprising at least one optical fiber according to claim 1.

12. An optical link comprising N optical fibers, with N≥2, N being an integer, each optical fiber of index $i \in [1;N]$ comprising a central optical core and an optical cladding surrounding the optical core, the optical core having a $\alpha_i$ graded-index profile $n_i(r)$ with $\alpha_i$ between 1 and 3, $\alpha_i$ being a non-dimensional parameter that defines an index profile shape of the optical core, that is a function of a radial distance r from the center of said optical core, and the optical core having a maximal refractive index $N_{oi}$, and an outer radius $R_{1bi}$ with a refractive index difference $Dn_{1bi}=n_i(R_{1bi})-n_{Cli}$ with respect to said optical cladding having at its outer edge a refractive index $n_{Cli}$, said optical core also having a radius $R_{1i}$, such that $n_i(R_{1i})=n_{Cli}$, and a maximum refractive index difference $Dn_{1i}=n_{0i}-n_{Cli}$, said optical cladding comprising:

a region of depressed refractive index $n_{trenchi}$, called a trench, surrounding the optical core, said trench having an outer radius $R_{3i}$, and a refractive index difference $Dn_{3i}=n_{trenchi}-n_{Cli}$ between the trench and the cladding;

an intermediate region of depressed refractive index, called an intermediate trench, surrounding the optical core, said intermediate trench having an outer radius $R_{2i}$, with $R_{1bi}<R_{2i}<R_{3i}$, and a refractive index difference $Dn_{2i}$ between the intermediate trench and the cladding, with $Dn_{3i}<Dn_{2i}<0$, wherein an average optical core radius $R_{1link}$ for said optical link is comprised between 21.5 μm and 27 μm, where $$R_{1link} = \frac{\sum_{i=1}^{N} R_{1i}L_i}{\sum_{i=1}^{N} L_i}$$

with $L_i$ a length of optical fiber i in said link, an average maximum refractive index difference $Dn_{1link}$ for said optical link is between $12.5 \times 10^{-3}$ and $20 \times 10^{-3}$, where $$Dn_{1link} = \frac{\sum_{i=1}^{N} Dn_{1i}L_i}{\sum_{i=1}^{N} L_i},$$

at $\lambda=\lambda_C$, where $\lambda_c$ is a central transmission wavelength of an operating band for which said optical fiber is intended, an average trench outer radius $R_{3link}$ for said optical link is between 30 μm and 42 μm, where $$R_{3link} = \frac{\sum_{i=1}^{N} R_{3i}L_i}{\sum_{i=1}^{N} L_i}$$

with $L_i$ a length of optical fiber i in said link, an average refractive index difference between the trench and the cladding $Dn_{3link}$, for said optical link is comprised between $-15\times10^{-3}$ and $-6\times10^{-3}$, at $\lambda=\lambda_C$, where $$Dn_{3link} = \frac{\sum_{i=1}^{N} Dn_{3i}L_i}{\sum_{i=1}^{N} L_i},$$

and wherein:

for $|Dn_{1blink}-Dn_{2link}|\geq 0.5\times10^{-3}$, $\mathrm{Min}(Dn_{1blink}, Dn_{2link})\leq -1.5\times10^{-3}$, and for $|Dn_{1blink}-Dn_{2link}|<0.5\times10^{-3}$, $Dn_{2link}$ is between $-5\times10^{-3}$ and $-3.5\times10^{-3}$ where $$Dn_{2link} = \frac{\sum_{i=1}^{N} Dn_{2i}L_i}{\sum_{i=1}^{N} L_i}$$

is the average refractive index difference between the intermediate trench and the cladding for said optical link and where $$Dn_{1blink} = \frac{\sum_{i=1}^{N} Dn_{1bi}L_i}{\sum_{i=1}^{N} L_i}$$

is the average refractive index difference between the core at its outer radius and the cladding for said optical link, both at $\lambda=\lambda_C$, where $\lambda_c$ is a central transmission wavelength of an operating band for which said optical link is intended.

13. The optical link according to claim 12, wherein its normalized frequency $$V_{link} = \frac{2\pi R_{1link}}{\lambda_c}\sqrt{n_{0link}^2 - n_{Cllink}^2}$$

is between 18.4 and 23, where $$n_{0link} = \frac{\sum_{i=1}^{N} n_{0i}L_i}{\sum_{i=1}^{N} L_i}$$

the average maximum refractive index of the core for said optical link, and where $$n_{Cllink} = \frac{\sum_{i=1}^{N} n_{Cli}L_i}{\sum_{i=1}^{N} L_i}$$

is the average refractive index of the cladding for said optical link.

14. The optical link according to claim 12, wherein the optical link guides at least 25 LP modes.

15. The optical link according to claim 12, wherein the optical link guides at least 30 LP modes.

16. The optical link according to claim 12, wherein for all optical fibers $i\in[1;N]$ in said link, said lengths $L_i$ are chosen so as to minimize $\mathrm{Max}|DMGD_{link}|$ on said link, where $DMGD_{link}$ is the Differential Mode Group Delay between two guided modes in said optical link and where $\mathrm{Max}|DMGD|_{link}$ is the absolute maximum value of Differential Mode Group Delay between any combination of guided modes in said optical link.

17. The optical link according to claim 16, wherein $\mathrm{Max}|DMGD_{link}|<200$ ps/km at $\lambda=\lambda_C$, where $\lambda_c$ is a central transmission wavelength of an operating band for which said optical fiber is intended.

18. The optical link according to claim 17, wherein $\mathrm{Max}|DMGD_{link}|<500$ ps/km for $\lambda\in[\lambda_C-\delta\lambda; \lambda_C+\delta\lambda]$, where $\lambda_c$ is a central transmission wavelength of an operating band for which said optical fiber is intended and where $2\delta\lambda$ is a width of said operating band.

19. The optical link according to claim 12, wherein at least two optical fibers in said link have $DMGD_i$ showing opposite signs for at least one mode guided by said optical fibers, where $DMGD_i$ is the Differential Mode Group Delay between said one mode and any other guided mode in optical fiber i.

20. The optical link according to claim 12, wherein $\mathrm{Max}|BL_{link}|<100$ dB/turn, at 10 mm bend radius at $\lambda=\lambda_C$ where $BL_{link}$ are the bend losses of the different guided modes in said optical link, and where $\mathrm{Max}|BL_{link}|$ is the absolute maximum value of $BL_{link}$ for all guided modes in said optical link.

21. The optical link according to claim 12, wherein $\lambda_c=1550$ nm and $\delta\lambda=20$ nm.

22. The optical link comprising N optical fibers according to claim 12, with $N\geq 2$, being an integer,
wherein any two optical fibers chosen among said N optical fibers forming said optical link have refractive index differences $Dn_1$ and/or $Dn_2$ and/or $Dn_3$ at $\lambda_c$ with values differing by a maximum of $0.5\times10^{-3}$ and/or radii $R_1$ and/or $R_{1b}$ and/or $R_2$ and/or $R_3$ with values differing by a maximum of 0.5 μm,
and wherein at least two of said N optical fibers have DMGD with opposite signs, where DMGD is the Differential Mode Group Delay between two guided modes in said optical fiber.

23. An optical system comprising at least one optical link according to claim 12.

* * * * *